(12) United States Patent
Plantenga et al.

(10) Patent No.: US 8,012,343 B2
(45) Date of Patent: Sep. 6, 2011

(54) HEAVY FEED HPC PROCESS USING A MIXTURE OF CATALYSTS

(76) Inventors: Frans Lodewijk Plantenga, Hoevelaken (NL); Katsuhisa Fujita, Niihama (JP); Satoshi Abe, Saijo (JP)

( * ) Notice: Subject to any disclaimer, the term of this patent is extended or adjusted under 35 U.S.C. 154(b) by 0 days.

(21) Appl. No.: 10/728,489

(22) Filed: Dec. 5, 2003

(65) Prior Publication Data
US 2004/0134835 A1   Jul. 15, 2004

Related U.S. Application Data

(60) Provisional application No. 60/431,624, filed on Dec. 6, 2002.

(51) Int. Cl.
*C10G 47/04* (2006.01)
*C10G 45/04* (2006.01)

(52) U.S. Cl. ............. 208/111.1; 208/111.35; 208/120.3; 208/120.35; 208/243; 208/244; 208/253; 208/254 H; 208/295; 502/313

(58) Field of Classification Search ............... 208/49, 208/111.1, 216 PP; 502/313
See application file for complete search history.

(56) References Cited

U.S. PATENT DOCUMENTS

| 3,887,455 | A | * | 6/1975 | Hamner et al. | ............... 208/112 |
| 3,898,155 | A | * | 8/1975 | Wilson | ............... 208/216 PP |
| 4,225,421 | A | * | 9/1980 | Hensley et al. | ......... 208/216 PP |
| 4,414,141 | A | * | 11/1983 | Schindler | ....................... 502/314 |
| 4,499,203 | A |   | 2/1985 | Toulhoat et al. | ............... 502/247 |
| 4,526,675 | A | * | 7/1985 | Mahoney et al. | ............. 208/106 |
| 5,100,855 | A |   | 3/1992 | Clark et al. | ................... 502/211 |
| 5,308,472 | A | * | 5/1994 | Dai et al. | .................. 208/111.3 |
| 6,086,749 | A |   | 7/2000 | Kramer et al. | ............... 208/213 |

FOREIGN PATENT DOCUMENTS

| WO | 02/053286 | 7/2002 |
| WO | 02/100541 | 12/2002 |

OTHER PUBLICATIONS

Van Kerkvoort, et al., *Determination of Dry-Sludge Content of Fuel Oils: Development of The Shell Hot Filtration Test (SHFT)*, 1951, Inst. Pet., 37, pp. 596-604.

* cited by examiner

*Primary Examiner* — Tam M Nguyen
(74) *Attorney, Agent, or Firm* — Jeremy J. Kliebert

(57) ABSTRACT

The present invention pertains to a process for the hydroprocessing of heavy hydrocarbon feeds, preferably in an ebullating bed process, by contacting the feed with a mixture of two hydroprocessing catalysts meeting specified pore size distribution requirements. The process combines high contaminant removal with high conversion, low sediment formation, and high process flexibility.

10 Claims, No Drawings

HEAVY FEED HPC PROCESS USING A MIXTURE OF CATALYSTS

CROSS REFERENCE TO RELATED APPLICATION

Priority of this application is based on U.S. Provisional Application No. 60/431,624, filed Dec. 6, 2002, the content of which is incorporated herein by reference.

BACKGROUND OF THE INVENTION

1. Field of the Invention

The present invention relates to a process for hydroprocessing a heavy hydrocarbon oil, in particular a process in which a mixture of two catalysts is used to obtain advantageous effects in the hydroprocessing of heavy hydrocarbon oils. The present invention also relates to a mixture of catalysts suitable for use in such a process.

2. Prior Art

Hydrocarbon oils containing 50 wt. % or more of components with a boiling point of 538° C. or higher are called heavy hydrocarbon oils. These include atmospheric residue (AR) and vacuum residue (VR), which are produced in petroleum refining. It is desired to remove impurities such as sulfur from these heavy hydrocarbon oils by hydroprocessing, and to convert them into lighter oils, which have a higher economic value.

The hydroprocessing of heavy hydrocarbon oils is done in ebullating bed operation or in fixed bed operation.

For ebullating bed operation, various catalysts have been proposed. Generally, these catalysts are capable of efficiently removing sulfur, Conradson carbon residue (CCR), various metals, nitrogen and/or asphaltenes. However, it was found that the decomposition of asphaltenes, an aggregate of condensed aromatic compounds which is in good balance with the rest of the feedstock, is generally accompanied by the formation of sediment and sludge.

Sediment can be determined by the Shell hot filtration solid test (SHFST). (see Van Kerkvoort et al., *J. Inst Pet.*, 37, pp. 596-604 (1951)). Its ordinary content is said to be about 0.19 to 1 wt. % in product with a boiling point of 340° C. or higher collected from the bottom of a flash drum.

Sediment formed during hydroprocessing operations may settle and deposit in such apparatuses as heat exchangers and reactors, and because it threatens to close off the passage, it can seriously hamper the operation of these apparatuses. Especially in the hydroprocessing of heavy hydrocarbon feeds containing large amounts of vacuum residue, sediment formation is an important factor, and there is therefore need for a process for effecting efficient contaminant removal in combination with low sediment formation and high conversion.

U.S. Pat. No. 5,100,855 describes a catalyst mixture for effecting hydrodemetallization, hydrodesulphurisation, hydrodenitrogenation and hydroconversion of an asphaltene-containing feedstock, wherein one catalyst is a relatively small-pore catalyst and the other possesses a relatively large amount of macropore volume. The catalyst mixture is preferably applied in an ebullating bed. The first catalyst has less than 0.10 ml/g of pore volume in pores with a diameter above 200 Å, less than 0.02 ml/g in pores with a diameter above 800 Å, and a maximum average mesopore diameter of 130 Å. The second catalyst has more than 0.07 ml/g of pore volume in pores with a diameter of greater than 800 Å.

U.S. Pat. No. 6,086,749 describes a process and catalyst system for use in a moving bed, wherein a mixture of two types of catalysts is used, each designed for a different function such as hydrodemetallization and hydrodenitrogenation, respectively. At least one of the catalysts preferably has at least 75% of its pore volume in pores with a diameter of 100-300 Å, and less than 20% of its pore volume in pores with a diameter below 100 Å.

SUMMARY OF THE INVENTION

In one embodiment, the present invention is a process for hydroprocessing a heavy hydrocarbon oil, comprising contacting a heavy hydrocarbon oil in the presence of hydrogen with a mixture of hydroprocessing catalyst I and hydroprocessing catalyst II, wherein catalyst I comprises a Group VIB metal component and optionally a Group VIII metal component on a porous inorganic carrier, said catalyst having a specific surface area of at least 100 m$^2$/g, a total pore volume of at least 0.55 ml/g, at least 50% of the total pore volume in pores with a diameter of at least 20 nm (200 Å), and 10-30% of the total pore volume in pores with a diameter of at least 200 nm (2000 Å) and catalyst II comprises a Group VIB metal component and optionally a Group VIII metal component on a porous inorganic carrier, said catalyst having a specific surface area of at least 100 m$^2$/g, a total pore volume of at least 0.55 ml/g, at least 75% of the total pore volume in pores with a diameter of 10-120 nm (100-1200 Å), 0-2% of the total pore volume in pores with a diameter of at least 400 nm (4000 Å), and 0-1% of the total pore volume in pores with a diameter of at least 1000 nm (10000 Å).

In another embodiment, the present invention pertains to a mixture of catalysts suitable for use in the above process, wherein the catalyst mixture comprises catalysts I and II defined above.

Other embodiments of the invention relate to process details and catalyst properties and composition, all of which will be discussed hereinbelow.

DETAILED DESCRIPTION OF THE INVENTION

The object of the present invention is to provide an effective process for the hydroprocessing of a heavy hydrocarbon oil containing a large amount of impurities such as sulfur, Conradson carbon residue, metals, nitrogen, and asphaltene, especially a heavy oil containing 80% or more vacuum residue fractions, for adequately removing the impurities. In addition to efficient contaminant removal, the process should show low sediment formation, high asphaltene removal, and high conversion. Further, it should possess high flexibility.

On the basis of diligent research, a process was invented for the hydroprocessing of heavy hydrocarbon oils, wherein a heavy oil is contacted with a mixture of two different hydrotreating catalysts, both catalysts meeting specific requirements as to surface area, pore volume, and pore size distribution. The first catalyst is specifically designed to decrease the impurities in the heavy hydrocarbon oil. In particular, it achieves demetallisation and efficient asphaltene removal, which is effective in preventing asphaltene precipitation. The second catalyst is tailored to effect advanced desulfurisation and hydrogenation reactions while inhibiting sediment formation due to asphaltene precipitation, to allow stable operation.

The use of a mixture of the two different catalysts leads to a synergistic effect resulting in a process showing stable operation, high contaminant removal and conversion activity, and low sediment formation, this in combination with great flexibility in operation.

More particularly, the present invention relates to a process suitable for the hydroprocessing of heavy hydrocarbon oils containing a large amount of impurities such as sulfur, metals, and asphaltene to effect hydrodesulfurization (HDS), hydrodemetallization (HDM), asphaltene reduction (HDAsp) and/or conversion into lighter products, while limiting the amount of sediment produced. The feed may also contain other contaminants such as Conradson carbon residue (CCR) and nitrogen, and carbon residue reduction (HDCCR) and hydrodenitrification (HDN) may also be desired processes.

The catalysts used in the process according to the invention comprise catalytic materials on a porous carrier. The catalytic materials present on the catalysts used in the process according to the invention comprise a Group VIB metal and optionally a Group VIII metal of the Periodic Table of Elements applied by Chemical Abstract Services (CAS system). It is preferred for a Group VIII metal to be present on the catalysts used in the process according to the invention. The Group VIII metal used in this invention is at least one selected from nickel, cobalt, and iron. In view of performance and economy, cobalt and nickel are preferred. Nickel is especially preferred. As the Group VIB metals which can be used, molybdenum, tungsten, and chromium may be mentioned, but in view of performance and economy, molybdenum is preferred. The combination of molybdenum and nickel is particularly preferred for the catalytic materials of the catalyst according to the invention.

Based on the weight (100 wt. %) of the final catalyst, the amounts of the respective catalytic materials used in the catalysts used in the process according to the invention are as follows.

The catalysts generally comprise 4-30 wt. % of Group VIB metal, calculated as trioxide, preferably 7-20 wt. %, more preferably 8-16 wt. %. If less than 4 wt. % is used, the activity of the catalyst is generally less than optimal. On the other hand, if more than 16 wt. %, in particular more than 20 wt. % is used, the catalytic performance is generally not improved further. Optimum activity is obtained when the Group VI metal content is selected to be within the cited preferred ranges.

As indicated above, it is preferred for the catalysts to comprise a Group VIII metal component. If applied, this component is preferably present in an amount of 0.5-6 wt. %, more preferably 1-5 wt. %, of Group VIII metal, calculated as oxide. If the amount is less than 0.5 wt. %, the activity of the catalysts is less than optimal. If more than 6 wt. % is present, the catalyst performance will not be improved further.

The total pore volume of catalyst I and catalyst II is at least 0.55 ml/g, preferably at least 0.6 ml/g. It is preferred for it to be at most 1.0 ml/g, more preferably at most 0.9 ml/g. The determination of the total pore volume and the pore size distribution is effected via mercury penetration at a contact angle of 140° with a surface tension of 480 dynes/cm, using, for example, a mercury porosimeter Autopore II (trade name) produced by Micrometrics.

Catalyst I has a specific surface area of at least 100 m$^2$/g. For the catalyst to meet the required pore size distribution ranges, it is preferred for it to have a surface area of 100-180 m$^2$/g, preferably 150-170 m$^2$/g. If the surface area is less than 100 m$^2$/g, the catalytic activity will be too low. In the present specification the surface area is determined in accordance with the BET method based on N$_2$ adsorption. Catalyst I has at least 50% of the total pore volume in pores with a diameter of at least 20 nm (200 Å), preferably at least 60%. The percentage of pore volume in this range is preferably at most 80%. If the percentage of pore volume in this range is below 50%, the catalytic performance, especially the asphaltene cracking activity, will decrease. As a result thereof, sediment formation will increase. The carrier of catalyst I preferably shows at least 43% of pore volume in this range, more preferably at least 47%. The percentage of pore volume in this range for the carrier preferably is at most 75%, more preferably at most 70%.

Catalyst I has 10-30% of the total pore volume in pores with a diameter of at least 200 nm (2000 Å), preferably 15-25%. If the percentage of pores in this range is too low, the asphaltene removal capacity in the bottom of the reactor will decrease, therewith increasing sediment formation. If the percentage of pores in this range is too high, the mechanical strength of the catalyst will decrease, possibly to a value which may be unacceptable for commercial operation.

To improve catalyst strength and activity, Catalyst I preferably has 0-5% of the total pore volume in pores with a diameter above 1000 nm (10000 Å), more preferably 0-1%.

Especially when the feedstock contains a large amount of vacuum residue, that is, if the percentage of the feed boiling above 538° C. is at least 70%, more preferably at least 80%, it is preferred for Catalyst I to have a %PV(10-120 nm) (%PV(100-1200 Å)) of less than 85%, preferably less than 82%, still more preferably less than 80%. If the percentage of pore volume present in this range becomes too high, the percentage of pore volume in pores with a diameter above 200 nm (2000 Å) will decrease, and the residue cracking rate may be insufficient. It is preferred for Catalyst I to have less than 0.2 ml/g of pore volume in pores with a diameter of 50-150 nm (500 to 1,500 Å). If more than 0.2 ml/g of pore volume is present in this range, the relative percentage of pore volume present in pores with a diameter below 30 nm (300 Å) will decrease, and the catalytic performance may decline. Additionally, since pores with a diameter below 30 nm (300 Å) are liable to closing by very heavy feedstock components, it is feared that the life of the catalyst may be shortened if the amount of pore volume present in this range is relatively too small.

Additionally, it is preferred for Catalyst I to have less than 25% of its pore volume in pores with a diameter of 10 nm (100 Å) or less, more preferably less than 17%, still more preferably less than 10%. If the percentage of pore volume present in this range is above this value, sediment formation may increase due to increased hydrogenation of the non-asphaltenic feed constituents.

Catalyst I is based on a porous inorganic oxide carrier which generally comprises the conventional oxides, e.g., alumina, silica, silica-alumina, alumina with silica-alumina dispersed therein, silica-coated alumina, magnesia, zirconia, boria, and titania, as well as mixtures of these oxides. It is preferred for the carrier to consist for at least 80% of alumina, more preferably at least 90%, still more preferably at least 95%. A carrier consisting essentially of alumina is preferred, the wording "consisting essentially of" being intended to mean that minor amounts of other components may be present, as long as they do not detrimentally affect the catalytic activity of the catalyst. An example of a suitable catalyst I is the catalyst described in WO 01/100541.

Catalyst II has a specific surface area of at least 100 m$^2$/g, preferably at least 130 m$^2$/g. If the surface area is below 100 m$^2$/g, the catalytic activity will be insufficient.

Catalyst II will have at least 75% of the total pore volume in pores with a diameter of 10-120 nm (100-1200 Å), preferably at least 78%. If the percentage of pore volume in this range is insufficient, the hydrocracking and hydrodesulfurization activity of the catalyst will be insufficient. Catalyst II has 0-2% of the total pore volume in pores with a diameter of at least 400 nm (4000 Å), and 0-1% of the total pore volume in pores with a diameter of at least 1000 nm (10000 Å). If these requirements are not met, the stability of the hydrodesulfurization and hydrocracking activity of Catalyst II cannot be guaranteed.

Catalyst II has a %PV(>2000 Å) which is less than that of catalyst I. Preferably, it is less than 10%, more preferably it is less than 5%, still more preferably it is less than 3%.

Additionally, it is preferred for Catalyst II to have less than 25% of its pore volume in pores with a diameter of 10 nm (100 Å) or less, more preferably less than 17%, still more preferably less than 10%. If the percentage of pore volume present in this range is above this value, sediment formation may increase due to increased hydrogenation of the non-asphaltenic feed constituents.

Catalyst II is also based on a porous inorganic oxide carrier which generally comprises the conventional oxides, e.g., alumina, silica, silica-alumina, alumina with silica-alumina dispersed therein, silica-coated alumina, magnesia, zirconia, boria, and titania, as well as mixtures of these oxides. It is preferred for the carrier to consist for at least 70 wt. % of alumina, more preferably at least 88 wt. %, with the balance being made up of silica.

We have developed two specific embodiments of catalyst II, which were found to be particularly suitable for use in the process according to the invention.

The first specific embodiment, further indicated as Catalyst IIa, has a surface area of at least 100 m$^2$/g. It is preferably between 100 and 180 m$^2$/g, more preferably between 150 and 170 m$^2$/g. It has at least 75% of the total pore volume in pores with a diameter of 10-120 nm (100-1200 Å), preferably at least 85%, more preferably at least 87%. Catalyst IIa preferably has a %PV(>200 Å of at least 50%, preferably 60-80%, a %PV(>1000 Å) of at least 5%, preferably 5-30%, more preferably 8-25%.

Catalyst IIa preferably is based on an alumina carrier. As the alumina carrier in this embodiment, a carrier consisting essentially of alumina is preferred, the wording "consisting essentially of" being intended to mean that minor amounts of other components may be present, as long as they do not detrimentally affect the catalytic activity of the catalyst.

However, if it is necessary to improve catalyst strength and/or carrier acidity, the carrier can contain at least one material selected, for example, from oxides of silicon, titanium, zirconium, boron, zinc, phosphorus, alkali metals and alkaline earth metals, zeolite, and clay minerals. These material are preferably present in an amount of less than 5 wt. %, based on the weight of the completed catalyst, preferably less than 2.5 wt. %, more preferably less than 1.5 wt. %, still more preferably less than 0.5 wt. %. Suitable catalysts meeting the requirements of catalyst IIa are described in WO 02/053286.

The second specific embodiment, further indicated as Catalyst IIb, has a surface area of at least 150 m$^2$/g, preferably 185-250 m$^2$/g. It has at least 75% of the total pore volume in pores with a diameter of 10-120 nm (100-1200 Å), preferably at least 78%. It may be preferred for catalyst IIb to have less than 50% of its pore volume present in pores with a diameter of above 200 Å, more preferably less than 40%.

Catalyst IIb is preferably based on a carrier comprising at least 3.5 wt. % of silica, calculated on the weight of the final catalyst, more preferably 3.5-30 wt. %, still more preferably 4-12 wt. %, even more preferably 4.5-10 wt. %. The presence of at least 3.5 wt. % of silica has been found to increase the performance of Catalyst IIb. The balance of the carrier of catalyst IIb is generally made up of alumina, optionally containing other refractory oxides, such as titania, zirconia, etc. It is preferred that the balance of the carrier of catalyst IIb is made up of at least 90% of alumina, more preferably at least 95%. It is preferred for the carrier of the catalyst of the invention to consist essentially of silica and alumina, the wording "consists essentially of" being intended to mean that minor amounts of other components may be present, as long as they do not detrimentally affect the catalytic activity of the catalyst.

It may also be preferred for Catalyst IIb to comprise a Group IA metal component. Sodium and potassium may be mentioned as suitable materials. Sodium is preferred for reasons of performance and economy. The amount of Group IA metal is 0.1-2 wt. %, preferably 0.2-1 wt. %, more preferably 0.1-0.5 wt. %, calculated as oxide.

If less than 0.1 wt. % is present, the desired effect will not be obtained. If more than 2 wt. %, is present, or sometimes more than 1 wt. %, the activity of the catalyst will be adversely affected.

It may additionally be preferred for catalyst IIb to comprise a compound of Group VA, more in particular one or more compounds selected from phosphorus, arsenic, antimony, and bismuth. Phosphorus is preferred. The compound in this case preferably is present in an amount of 0.05-3 wt. %, more preferably 0.1-2 wt. %., still more preferably 0.1-1 wt. %, calculated as $P_2O_5$.

A particularly preferred embodiment of catalyst IIb comprises the combination of silica and a Group IA metal component, in particular sodium, as described above.

Another particularly preferred embodiment of catalyst IIb comprises the combination of silica and phosphorus as described above.

Still another particularly preferred embodiment of catalyst IIb comprises the combination of silica, Group IA metal component, in particular sodium, and phosphorus as described above.

Optionally, catalyst II of the present invention comprises a mixture of catalysts IIa and IIb. If a mixture of catalyst IIa and catalyst IIb is used, it is preferred for catalyst IIa to have at least 50% of its pore volume in pores with a diameter above 200 Å, more preferably 60-80%, while for catalyst IIb it is preferred to have less than 50% of its pore volume present in pores with a diameter of above 200 Å, more preferably less than 40%.

If this requirement is met, catalyst IIa will show good asphaltene cracking properties and low sediment formation and catalyst IIb will show good hydrodesulfurization activity and good hydrogenation activity, and the combination will lead to very good results.

If a mixture of catalysts IIa and IIb is applied, the mixture has to comprise at least 1 wt. % of catalyst IIb, calculated on the total amount of catalysts IIa and IIb, preferably at least 10 wt. %. The mixture preferably comprises up to 50 wt. % of catalyst IIb, preferably up to 30 wt. %.

If this requirement is met, the hydrogenation activity of the total amount of catalyst II will be well-balanced, and low sediment formation can easily be obtained. If catalyst II comprises a mixture of catalysts IIa and IIb, it is particularly preferred for catalyst IIb to comprise a compound of Group VA, more in particular one or more compounds selected from phosphorus, arsenic, antimony, and bismuth, more in part phosphorus, as described above.

As indicated above, the present invention is directed to a mixture of catalyst I and catalyst II and its use in the hydro-processing of heavy hydrocarbon feeds. In the context of the present invention, the term mixture is intended to refer to a catalyst system wherein, when the catalyst has been brought into the unit, both the top half of the catalyst volume and the bottom half of the catalyst volume contain at least 1% of both types of catalyst. The term mixture is not intended to refer to a catalyst system wherein the feed is first contacted with one type of catalyst and then with the other type of catalyst. The term catalyst volume is intended to refer to the volume of catalyst comprising both catalyst I and catalyst II. Optional following layers or units comprising other catalyst types are not included therein.

It is preferred for the mixture in the context of the present invention to be such that if the catalyst volume is horizontally divided into four parts of equal volume, each part contains at least 1% of both types of catalyst. It is even more preferred for the mixture in the context of the present invention to be such that if the catalyst volume is horizontally divided into ten parts of equal volume, each part contains at least 1% of both types of catalyst.

In the above definitions, at least 1% of both types of catalyst should be present in the indicated section, preferably at least 5%, more preferably at least 10%.

Obviously it is not intended for, e.g., the right-hand half of the unit to be filled with one type of catalyst while the left-hand half of the unit is filled with another type of catalyst. Accordingly, the word mixture as applied in the present invention also requires that both the right-hand side and the left hand side of the catalyst volume contain at least 1% of both types of catalyst. Preferably, if the catalyst volume is vertically divided into four parts of equal volume, each part contains at least 1% of both types of catalyst. More preferably, if the catalyst volume is vertically divided into ten parts of equal volume, each part contains at least 1% of both types of catalyst. In the definitions in this paragraph, at least 1% of both types of catalyst should be present in the indicated section, preferably at least 5%, more preferably at least 10%.

There are various ways in which a catalyst mixture can be obtained. The first one, which is inherent to ebullating bed operation and preferred for fixed bed operation, is a random mixture of the two types of catalyst particles. With regard to ebullating bed operation it should be noted that the word random includes natural segregation taking place in the unit due to differences in density between the catalyst particles.

A further method applicable to fixed bed units would be to apply the two types of catalysts in (thin) alternating layers.

An additional method would be to sock-load the unit with socks of the two types of catalysts, wherein each sock contains one type of catalyst, but wherein the combination of socks results in a mixture of catalysts as defined above.

Overall, the mixture of catalysts I and II generally comprises 2-98 wt. % of catalyst I and 2-98 wt. % of catalyst II. Preferably, the mixture comprises 10-90 wt. % of catalyst I, more preferably 20-80 wt. % of catalyst I, still more preferably 30-70 wt. % of catalyst I. The mixture preferably comprises 10-90 wt. % of catalyst II, more preferably 20-80 wt. % of catalyst II, still more preferably 30-70 wt. % of catalyst II.

The catalyst particles can have the shapes and dimensions common to the art. Thus, the particles may be spherical, cylindrical, or polylobal and their diameter may range from 0.5 to 10 mm. Particles with a diameter of 0.5-3 mm, preferably 0.7-1.2 mm, for example 0.9-1 mm, and a length of 2-10 mm, for example 2.5-4.5 mm, are preferred. For use in fixed bed operation polylobal particles are preferred, because they lead to a reduced pressure drop in hydrodemetallization operations. Cylindrical particles are preferred for use in ebullating bed operations.

The carrier to be used in the catalysts to be used in the process according to the invention can be prepared by processes known in the art.

A typical production process for a carrier comprising alumina is coprecipitation of sodium aluminate and aluminum sulfate. The resulting gel is dried, extruded, and calcined, to obtain an alumina-containing carrier. Optionally, other components such as silica may be added before, during, or after precipitation.

By way of example, a process for preparing an alumina gel will be described below. First, a tank containing tap water or warm water is charged with an alkali solution of sodium aluminate, aluminum hydroxide or sodium hydroxide, etc., and an acidic aluminum solution of aluminum sulfate or aluminum nitrate, etc. is added for mixing.

The hydrogen ion concentration (pH) of the mixed solution changes with the progression of the reaction. It is preferable that when the addition of the acidic aluminum solution is completed, the pH is 7 to 9, and that during mixing, the temperature is 60 to 75° C. The mixture is then kept at that temperature for, in general, 0.5-1.5 hours, preferably for 40-80 minutes.

By way of a further example, a process for preparing a silica-containing alumina gel is described below. First, an alkali solution such as sodium aluminate, ammonium hydroxide or sodium hydroxide is fed into a tank containing tap water or hot water, an acid solution of an aluminum source, e.g., aluminum sulfate or aluminum nitrate, is added, and the resulting mixture is mixed.

The pH of the mixture changes as the reaction progresses. Preferably, after all the acid aluminum compound solution has been added, the pH is 7 to 9. After completion of the mixing an alumina hydrogel can be obtained. Then, an alkali metal silicate such as a water glass or an organic silica solution is added as silica source. To mix the silica source, it can be fed into the tank together with the acid aluminum compound solution or after the aluminum hydrogel has been produced. The silica-containing alumina carrier can, for another example, be produced by combining a silica source such as sodium silicate with an alumina source such as sodium aluminate or aluminum sulfate, or by mixing an alumina gel with a silica gel, followed by moulding, drying, and calcining.

The carrier can also be produced by causing alumina to precipitate in the presence of silica in order to form an aggregate mixture of silica and alumina. Examples of such processes are adding a sodium aluminate solution to a silica hydrogel and increasing the pH by the addition of, e.g., sodium hydroxide to precipitate alumina, and coprecipitating sodium silicate with aluminum sulfate. A further possibility is to immerse the alumina carrier, before or after calcination, in an impregnation solution comprising a silicon source dissolved therein.

In a following stage, the gel is separated from the solution and a commercially used washing treatment, for example a washing treatment using tap water or hot water, is carried out to remove impurities, mainly salts, from the gel. Then, the gel is shaped into particles in a manner known in the art, e.g., by way of extrusion, beading or pelletising.

Finally, the shaped particles are dried and calcined. The drying is generally carried out at a temperature from room temperature up to 200° C., generally in the presence of air. The calcining is generally carried out at a temperature of 300 to 950° C., preferably 600 to 900° C., generally in the presence of air, for a period of 30 minutes to six hours. If so desired, the calcination may be carried out in the presence of steam to influence the crystal growth in the oxide.

By the above production process it is possible to obtain a carrier having properties which will give a catalyst with the surface area, pore volume, and pore size distribution characteristics specified above. The surface area, pore volume, and pore size distribution characteristics can be adjusted in a manner known to the skilled person, for example by the addition during the mixing or shaping stage of an acid, such as nitric acid, acetic acid or formic acid, or other compounds as moulding auxiliary, or by regulating the water content of the gel by adding or removing water.

The carriers of the catalysts to be used in the process according to the invention have a specific surface area, pore volume, and pore size distribution of the same order as those of the catalysts themselves. The carrier of catalyst I preferably has a surface area of 100-200 $m^2/g$, more preferably 130-170 $m^2/g$. The total pore volume is preferably 0.5-1.2 ml/g, more preferably 0.7-1.1 ml/g. The carrier of catalyst II preferably has a surface area of 180-300 $m^2/g$, more preferably 185-250 $m^2/g$, and a pore volume of 0.5-1.0 ml/g, more preferably 0.6-0.9 ml/g.

The Group VIB metal components, Group VIII metal components, and, where appropriate, Group IA metal components and compounds of Group V such as phosphorus, can be incorporated into the catalyst carrier in a conventional manner, e.g., by impregnation and/or by incorporation into the support material before it is shaped into particles.

At this point in time it is considered preferred to first prepare the carrier and incorporate the catalytic materials into the carrier after it has been dried and calcined. The metal components can be incorporated into the catalyst composition in the form of suitable precursors, preferably by impregnating the catalyst with an acidic or basic impregnation solution comprising suitable metal precursors. For the Group VIB metals, ammonium heptamolybdate, ammonium dimolybdate, and ammonium tungstenate may be mentioned as suitable precursors. Other compounds, such as oxides, hydroxides, carbonates, nitrates, chlorides, and organic acid salts, may also be used. For the Group VIII metals, suitable precursors include oxides, hydroxides, carbonates, nitrates, chlorides, and organic acid salts. Carbonates and nitrates are particularly suitable. Suitable Group IA metal precursors include nitrates and carbonates. For phosphorus, phosphoric acid may be used.

The impregnation solution, if applied, may contain other compounds the use of which is known in the art, such as organic acids, e.g., citric acid, ammonia water, hydrogen peroxide water, gluconic acid, tartaric acid, malic acid or EDTA (ethylenediamine tetraacetic acid). It will be clear to the skilled person that there is a wide range of variations on this process. Thus, it is possible to apply a plurality of impregnating stages, the impregnating solutions to be used containing one or more of the component precursors that are to be deposited, or a portion thereof. Instead of impregnating techniques, dipping processes, spraying processes, etc. can be used. In the case of multiple impregnation, dipping, etc., drying and/or calcining may be carried out in between.

After the metals have been incorporated into the catalyst composition, it is optionally dried, e.g., in air flow for about 0.5 to 16 hours at a temperature between room temperature and 200° C., and subsequently calcined, generally in air, for about 1 to 6 hours, preferably 1-3 hours at 200-800° C., preferably 450-600° C. The drying is done to physically remove the deposited water. The calcining is done to bring at least part, preferably all, of the metal component precursors to the oxide form.

It may be desirable to convert the catalyst, i.e., the Group VIB and Group VIII metal components present therein, into the sulfidic form prior to its use in the hydroprocessing of hydrocarbon feedstocks. This can be done in an otherwise conventional manner, e.g., by contacting the catalyst in the reactor at increasing temperature with hydrogen and a sulfur-containing feedstock, or with a mixture of hydrogen and hydrogen sulfide. Ex situ presulfiding is also possible.

The process of the present invention is particularly suitable for the hydroprocessing of heavy hydrocarbon feeds. It is particularly suitable for hydroprocessing heavy feedstocks of which at least 50 wt. %, preferably at least 80 wt. %, boils above 538° C. (1000° F.) and which comprise at least 2 wt. % of sulfur and at least 5 wt. % of Conradson carbon. The sulfur content of the feedstock may be above 3 wt. %. Its Conradson carbon content may be above 8 wt. %, preferably above 10 wt. %. The feedstock may contain contaminant metals, such as nickel and vanadium. Typically, these metals are present in an amount of at least 20 wtppm, calculated on the total of Ni and V, more particularly in an amount of at least 30 wtppm. The asphaltene content of the feedstock is preferably between 3 and 15 wt. %, more preferably between 5 and 10 wt. %.

Suitable feedstocks include atmospheric residue, vacuum residue, residues blended with gas oils, particularly vacuum gas oils, crudes, shale oils, tar sand oils, solvent deasphalted oil, coal liquefied oil, etc. Typically they are atmospheric residue (AR), vacuum residue (VR), and mixtures thereof.

The process according to the invention can be carried out in a fixed bed, in a moving bed, or in an ebullated bed. Carrying out the process in an ebullating bed is particularly preferred.

The process according to the invention can be carried out in a single reactor or in multiple reactors. If multiple reactors are used, the catalyst mixture used in the two reactors may be the same or different. If two reactors are used, one may or may not perform or more of intermediate phase separation, stripping, $H_2$ quenching, etc. between the two stages.

The process conditions for the process according to the invention may be as follows. The temperature generally is 350-450° C., preferably 400-440° C. The pressure generally is 5-25 MPA, preferably 14-19 MPA. The liquid hourly space velocity generally is 0.1-3 h-1, preferably 0.3-2 h-1. The hydrogen to feed ratio generally is 300-1,500 Nl/l, preferably 600-1000 Nl/l. The process is carried out in the liquid phase.

The invention will be elucidated below by way of the following examples, though it must not be deemed limited thereto or thereby.

EXAMPLE 1

Preparation of Catalyst A

A sodium aluminate solution and an aluminum sulfate solution were simultaneously added dropwise to a tank containing tap water, mixed at pH 8.5 at 77° C., and held for 70 minutes. The thus produced alumina hydrate gel was separated from the solution and washed with warm water, to remove the impurities in the gel. Then, the gel was kneaded for about 20 minutes and extruded as cylindrical particles having a diameter of 0.9 to 1 mm and a length of 3.5 mm. The extruded alumina particles were calcined at 800° C. for 2 hours, to obtain an alumina carrier.

100 g of the alumina carrier obtained as described above were immersed in 100 ml of a citric acid solution containing 17.5 g of ammonium molybdate tetrahydrate and 9.8 g of nickel nitrate hexahydrate at 25° C. for 45 minutes, to obtain a carrier loaded with metallic components.

Subsequently the loaded carrier was dried at 120° C. for 30 minutes and calcined at 620° C. for 1.5 hours, to complete a catalyst. The amounts of the respective components in the produced catalyst and the properties of the catalyst are shown in Table 1. Catalyst A meets the requirements of Catalyst I of the present invention.

Preparation of Catalyst B

The preparation of Catalyst A was repeated, except for the following modifications: In the carrier preparation, the temperature during the alumina gel formation was 65° C. The carrier calcination temperature was 900° C. In the catalyst preparation the impregnation solution contained 16.4 g of ammonium molybdate tetrahydrate, and the catalyst calcination temperature was 600° C. The composition and properties of Catalyst B are given in Table 1. Catalyst B meets the requirements of Catalyst II of the present invention.

Preparation of Catalyst C

To produce a silica-alumina carrier, a sodium aluminate solution was supplied to a tank containing tap water, and an aluminum sulfate solution and a sodium silicate solution were added and mixed. When the addition of the aluminum sulfate solution was completed, the mixture had a pH of 8.5. The mixture was kept at 64° C. for 1.5 hours. By such mixing a silica-alumina gel was produced. The sodium silicate concentration was set at 1.6 wt. % of the alumina gel solution.

The silica-alumina gel was isolated by filtration and washed with hot water to remove impurities from the gel. It was then extruded into cylindrical grains with a diameter of 0.9-1 mm and a length of 3.5 mm. The resulting particles were dried in air at a temperature of 120° C. for 16 hours and subsequently calcined in the presence of air for two hours at 800° C. to obtain a silica-alumina carrier. The silica-content of the obtained carrier was 7 wt. %.

One hundred grams of the thus obtained silica-alumina carrier were impregnated with 100 ml of an impregnation solution containing 16.4 g of ammonium molybdate tetrahydrate, 9.8 g of nickel nitrate hexahydrate, 0.66 g of sodium nitrate, and 50 ml of 25% ammonia water. The impregnated carrier was then dried at a temperature of 120° C. for 30 minutes and calcined in a kiln for 1.5 hours at 540° C. to produce a final catalyst. The composition and properties of this catalyst are given in Table 1. Catalyst C meets the requirements of Catalyst II of the present invention.

TABLE 1

Catalyst composition and properties

| | Catalyst | | |
|---|---|---|---|
| | Catalyst A | Catalyst B | Catalyst C |
| carrier | alumina | alumina | Al2O3 + 6% SiO2 |
| Group VIB wt. % ox | 13.1 | 11.9 | 11.5 |
| Group VIII wt. % ox | 2.0 | 2.0 | 2.1 |
| Group IA wt. % ox | 0 | 0 | 0.2 |
| surface area m²/g | 161 | 147 | 214 |
| total pore volume ml/g | 0.88 | 0.79 | 0.75 |
| % PV(>200 Å) | 63 | 74 | 25 |
| % PV(>2000 Å) | 24 | 1 | 1 |
| % PV(>10000 Å) | 0.1 | 0 | 0 |
| % PV(100–1200 Å) | 74 | 89 | 80 |
| % PV(>4000 Å) | 16 | 1 | 0.3 |
| % PV(<100 Å) | 0.4 | 0.4 | 14 |

Catalysts A through C were tested in various combinations in the hydroprocessing of a heavy hydrocarbon feedstock. The feedstock used in these examples was a Middle East petroleum consisting of 90 wt. % of vacuum residue (VR) and 10 wt. % of atmospheric residue (AR). The composition and properties of the feed are given in Table 2.

TABLE 2

Feedstock composition

| Middle East petroleum (VR:AR = 90:10) | |
|---|---|
| Sulfur (wt. %) | 4.9 |
| Nitrogen (wppm) | 3300 |
| Metals - vanadium (wppm) | 109 |
| Metals - nickel (wppm) | 46 |
| Conradson Carbon residue (wt. %) | 22.5 |
| C7-insolubles[1] (wt. %) | 8.0 |
| Vacuum residue[2] (wt. %) | 93 |
| Density (g/ml at 15° C.) | 1.0298 |

[1]Asphaltene fraction - matter insoluble in n-heptane
[2]Fraction boiling above 538° C. in accordance with ASTM D 5307 (distillation gas chromatography)

A mixture of at least two of Catalysts A through C were packed into a fixed bed reactor in the combinations given in Table 3 below. The catalyst bed contained equal volume amounts of catalyst.

The feedstock was introduced into the unit in the liquid phase at a liquid hourly space velocity of 1.5 h-1, a pressure of 16.0 MPa, an average temperature of 427° C., with the ratio of supplied hydrogen to feedstock ($H_2$/oil) being kept at 800 Nl/l.

The oil product produced by this process was collected and analysed to calculate the amounts of sulfur (S), metals (vanadium+nickel) (M), and asphaltene (Asp) removed by the process, as well as the 538° C.+fraction. The relative volume activity values were obtained from the following formulae.

$$RVA = 100 * k(\text{tested catalyst combination})/k(\text{comparative catalyst combination 2})$$

wherein for HDS $$k = (LHSV/(0.7)) * (1/y^{0.7} - 1/x^{0.7})$$

and for HDM and asphaltene removal $$k = LHSV * \ln(x/y)$$

with x being the content of S, M, or Asp in the feedstock, and y being the content of S, M, or Asp in the product.

Table 3 below gives the tested catalyst combinations and the results obtained.

TABLE 3

| | C. 1 | C. 2 | C. 3 | C. C. 1 | C. C. 2 | C. C. 3 |
|---|---|---|---|---|---|---|
| Catalyst I | A | A | A | A | B | C |
| Catalyst II | B | C | B + C 50:50 | A | B | C |
| RVA HDS | 106 | 116 | 110 | 102 | 100 | 129 |
| RVA HDM | 117 | 106 | 106 | 115 | 100 | 86 |
| RVA Asp | 119 | 109 | 109 | 116 | 100 | 72 |
| Cracking rate 538° C. + fraction (residue) (wt. %) | 41 | 42 | 41 | 37 | 40 | 43 |
| Sediment (wt. %)[1] | 0.1 | 0.09 | 0.22 | 0.09 | 0.28 | 0.60 |

[1]Sediment determined in accordance with the IP 375 method of the English Institute of Petroleum As can be seen from Table 3, the catalyst combinations according to the invention show high activities in HDS, HDM, and asphaltene removal in combination with a high residue cracking rate and low sediment formation.

The invention claimed is:

1. A process for hydroprocessing a heavy hydrocarbon oil, comprising contacting a heavy hydrocarbon oil in the presence of hydrogen with a mixture of hydroprocessing catalyst I and hydroprocessing catalyst II, wherein
catalyst I comprises a Group VIB metal component and optionally a Group VIII metal component on a porous inorganic carrier, said catalyst having a specific surface area of at least 100 m$^2$/g, a total pore volume of at least 0.55 ml/g, at least 50% of the total pore volume in pores with a diameter of at least 20 nm (200 Å), and 10-30% of the total pore volume in pores with a diameter of at least 200 nm (2000 Å), and
catalyst II comprises a Group VIB metal component and optionally a Group VIII metal component on a porous inorganic carrier, said catalyst having a specific surface area of at least 100 m$^2$/g, a total pore volume of at least 0.55 ml/g, at least 75% of the total pore volume in pores with a diameter of 10-120 nm (100-1200 Å), 0-2% of the total pore volume in pores with a diameter of at least 400 nm (4000 Å), and 0-1% of the total pore volume in pores with a diameter of at least 1000 nm (10000 Å); and wherein both catalyst I and catalyst II have less than 25% of their total pore volume in pores of a diameter of 10 nm (100 Å) or less.

2. The process of claim 1 wherein catalyst II comprises a catalyst IIa, a catalyst IIb, or a mixture thereof, wherein
catalyst IIa comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier, said catalyst having a specific surface area of 100-180 m$^2$/g, a total pore volume of at least 0.55 ml/g, at least 85% of the total pore volume in pores with a diameter of 10-120 nm (100-1200 Å), 0-2% of the total pore volume in pores with a diameter of at least 400 nm (4000 Å), and 0-1% of the total pore volume in pores with a diameter of at least 1000 nm (10000 Å) and
catalyst IIb comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier preferably comprising at least 3.5 wt. % of silica, calculated on the weight of the final catalyst, said catalyst, having a specific surface area of at least 150 m$^2$/g, a total pore volume of at least 0.55 ml/g, at least 75% of the total pore volume in pores with a diameter of 10-120 nm (100-1200 Å), 0-2% of the total pore volume in pores with a diameter of at least 400 nm (4000 Å), and 0-1% of the total pore volume in pores with a diameter of at least 1000 nm (10000 Å).

3. The process of claim 2 wherein catalyst IIb additionally comprises a Group IA metal component and/or a Group VA metal component, in particular phosphorus.

4. The process of claim 2 wherein a mixture of catalysts IIa and IIb is applied, wherein catalyst IIa has at least 50% of its pore volume in pores with a diameter above 200 Å, and catalyst IIb has at most 50% of its pore volume in pores with a diameter above 200 Å.

5. The process of claim 1 wherein the heavy hydrocarbon feed of which at least 50 wt. %, preferably at least 80 wt. %, boils above 538° C., and which comprises at least 2 wt. % of sulfur and at least 5 wt. % of Conradson Carbon.

6. The process of claim 1 which is carried out in an ebullating bed.

7. A mixture of catalysts comprising a catalyst I which comprises a Group VIB metal component and optionally a Group VIII metal component on a porous inorganic carrier, said catalyst having a specific surface area of at least 100 m$^2$/g, a total pore volume of at least 0.55 ml/g, and a pore size distribution for inhibiting sediment formation and promoting asphaltene removal such that at least 50% of the total pore volume in pores with a diameter of at least 20 nm (200 Å), and 10-30% of the total pore volume in pores with a diameter of at least 200 nm (2000 Å), and a catalyst II which comprises a Group VIB metal component and optionally a Group VIII metal component on a porous inorganic carrier, said catalyst having a specific surface area of at least 100 m$^2$/g, a total pore volume of at least 0.55 ml/g, and a pore size distribution for providing catalytic activity such that at least 75% of the total pore volume in pores with a diameter of 10-120 nm (100-1200 Å), 0-2% of the total pore volume in pores with a diameter of at least 400 nm (4000 Å), and 0-1% of the total pore volume in pores with a diameter of at least 1000 nm (10000 Å); and wherein both catalyst I and catalyst II have less than 25% of their total pore volume in pores of a diameter of 10 nm (100 Å) or less.

8. The catalyst mixture of claim 7 wherein catalyst II comprises a catalyst IIa, a catalyst IIb, or a mixture thereof, wherein
catalyst IIa comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier, said catalyst having a specific surface area of 100-180 m$^2$/g, a total pore volume of at least 0.55 ml/g, at least 85% of the total pore volume in pores with a diameter of 10-120 nm (100-1200 Å), 0-2% of the total pore volume in pores with a diameter of at least 400 nm (4000 Å), and 0-1% of the total pore volume in pores with a diameter of at least 1000 nm (10000 Å) and
catalyst IIb comprises 7 to 20 wt. % of a Group VIB metal component, calculated as trioxide on the weight of the catalyst, and 0.5 to 6 wt. % of a Group VIII metal component, calculated as oxide on the weight of the catalyst, on a porous inorganic carrier preferably comprising at least 3.5 wt. % of silica, calculated on the weight of the final catalyst, said catalyst having a specific surface area of at least 150 m$^2$/g, a total pore volume of at least 0.55 ml/g, at least 75% of the total pore volume in pores with a diameter of 10-120 nm (100-1200 Å), 0-2% of the total pore volume in pores with a diameter of at least 400 nm (4000 Å), and 0-1% of the total pore volume in pores with a diameter of at least 1000 nm (10000 Å).

9. The catalyst mixture of claim 8 wherein catalyst IIb additionally comprises a Group IA metal component and/or a Group VA metal component, in particular phosphorus.

10. The catalyst mixture of claim 8 wherein a mixture of catalysts IIa and IIb is applied, wherein catalyst IIa has at least 50% of its pore volume in pores with a diameter above 200 Å, and catalyst IIB has at most 50% of its pore volume in pores with a diameter above 200 Å.

* * * * *